United States Patent
Grossman

(10) Patent No.: US 6,475,522 B1
(45) Date of Patent: Nov. 5, 2002

(54) SYNTHETIC POLYMER COMPOSITIONS CONTAINING ANTIBIOTICS AS ANTIDEGRADANTS

(75) Inventor: Richard F. Grossman, Wilmington, DE (US)

(73) Assignee: Hammond Group, Inc., Hammond, IN (US)

( * ) Notice: Subject to any disclaimer, the term of this patent is extended or adjusted under 35 U.S.C. 154(b) by 16 days.

(21) Appl. No.: 09/651,776

(22) Filed: Aug. 30, 2000

(51) Int. Cl.[7] .................. A61K 9/10; A61K 31/43; A61K 31/545; A61K 31/536; C08L 27/14

(52) U.S. Cl. .................. 424/486; 514/192; 514/209; 514/210.08; 524/217; 524/545; 524/567

(58) Field of Search .................. 424/486, 422–425, 424/501; 514/209, 210.08, 192; 524/217, 545, 567

(56) References Cited

U.S. PATENT DOCUMENTS

| | | | |
|---|---|---|---|
| 2,985,648 A | 5/1961 | Doyle et al. | 260/239.1 |
| 3,067,099 A | 12/1962 | McCormick et al. | 167/65 |
| 3,079,307 A | 2/1963 | Kaufmann et al. | 195/36 |
| 3,140,282 A | 7/1964 | Johnson et al. | 260/239.1 |
| 3,144,445 A | 8/1964 | Grant et al. | 260/239.1 |
| 3,157,640 A | 11/1964 | Johnson | 260/239.1 |
| 3,192,198 A | 6/1965 | Nayler et al. | 260/239.1 |
| 3,816,253 A | 6/1974 | Takahashi et al. | 195/29 |
| 3,864,340 A | 2/1975 | Ishimaru et al. | 260/243 |
| 4,137,410 A | 1/1979 | Hoeksema | 544/101 |
| 4,919,939 A * | 4/1990 | Baker | 424/486 |

FOREIGN PATENT DOCUMENTS

| | | | |
|---|---|---|---|
| DE | 198 12 160 | 7/1999 | C08L/75/04 |
| DE | 198 52 192 | 5/2000 | A61K/31/495 |
| JP | 54131646 | 10/1979 | C08K/5/00 |

OTHER PUBLICATIONS

J. Mann and M.J.C. Crabbe, *Bacteria and Antibacterial Agents*, Spektrum, Oxford, 1996, Ch. 5 and Ch. 6.

A.D. Russell and I. Chopra (of SmithKline Beecham), *Understanding Antibacterial Action and Resistance*, 2nd Ed., Ellis Horwood, UK, 1996, pp. 183–186 and 195.

* cited by examiner

*Primary Examiner*—Edward J. Webman
*Assistant Examiner*—Helen Nguyen
(74) *Attorney, Agent, or Firm*—Wood, Herron & Evans, L.L.P.

(57) ABSTRACT

Synthetic polymer compositions contain antibiotics as antidegradants. Antibiotics from classes of glycopeptides and β-lactams have been found to prevent or inhibit synthetic polymer degradation.

5 Claims, No Drawings

SYNTHETIC POLYMER COMPOSITIONS CONTAINING ANTIBIOTICS AS ANTIDEGRADANTS

FIELD OF THE INVENTION

This invention is directed to synthetic polymer compositions containing antibiotics as antidegradants and methods of making them.

BACKGROUND OF THE INVENTION

Synthetic polymers include a wide variety of complex substances made by reactions of relatively simple compounds. For example, vinyl halide monomers produce halogenated polymers and olefin monomers produce polyolefins. Other polymers are formed by reaction of simple reactants such as phenol and formaldehyde to make phenol-formaldehyde polymers. An almost infinite number of products are made from synthetic polymers by the addition of modifying materials such as fillers, colorants, plasticizers, stabilizers, etc., and these products are generally known as plastics. Plastics are primary constituents of synthetic fibers, coating materials, such as paints and varnishes, adhesives, sealants, rubbers, elastomers, and the like.

Synthetic polymers in general can be classified by thermal behavior, i.e., thermoplastic and thermosetting polymers. They are also classified by their chemical nature, i.e., amino, alkyd, acrylic, vinyl, ester, cellulose, epoxy, urethane, siloxane, etc. In certain instances, they may be classified by their molecular structure, i.e., atactic, stereospecific, linear, crosslink, block, graph, ladder, etc. Different monomers may be reacted to produce copolymers or polymers themselves may be reacted by crosslinking.

Furthermore, just as polymers may be built up, so also they may be degraded. The process whereby polymers are degraded may be referred to as degradation, and additives which preclude degradation are referred to as antidegradants. The degradation of addition polymers may be affected by thermal or chemical reversal of the reaction of the monomers. The degradation of condensation polymers may be referred to by a hydrolytic reversal of the reaction of formation. Polymers may even be degraded by drastic mechanical working. It is well known in the art to add heat stabilizers, light stabilizers, antioxidants, and the like, to inhibit or prevent degradation.

Thus, synthetic polymers undergo degradation, usually when subjected to heat, light, chemical degradants, and other conditions which adversely cause the polymer to break down and lose its properties. Polymer additives have been used in the past to prevent or inhibit their degradation. Many stabilizers and antioxidants have been developed to prevent synthetic polymer degradation.

SUMMARY OF THE INVENTION

This invention is directed to a new class of synthetic polymer antidegradants. According to this invention, antibiotics have been found to prevent or inhibit synthetic polymer degradation.

Throughout this description, the term "antibiotic" is used to define a chemical substance produced by a microorganism which has the capacity to inhibit the growth of, or to kill, other microorganisms. While presently not desiring to be bound by mechanism or theory, it is believed that the effective antibiotics are those which resist hydrolysis by an enzyme. When used in an effective amount in a synthetic polymer composition, these antibiotics have been found to inhibit or prevent the degradation of the polymer.

In a presently most preferred form of the invention, glycopeptide antibiotics and β-lactam antibiotics are employed.

Aminoglycoside antibiotics are exemplified by streptomycin, neomycin, gentamicin, and vancomycin. β-lactam antibiotics are exemplified by penicillin, ampicillin, and amoxicillin. However, in these classes, certain antibiotics have not been found to be effective in certain polymers. For example, in the β-lactam group, amoxicillin has been found to be a very effective antioxidant in polyolefins and PVC. Analogs that do not contain the phenolic hydroxyl group such as ampicillin and penicillin have no effect in polyolefins and may even be prodegradants in PVC. In the related cephalosporin β-lactams, cephalexin is much less effective than cefadroxil, cephamycin, and latamoxef. It has been observed that those antibiotics which are more effective against polymer degradation and those that are less effective is that the former group contains a phenolic hydroxyl group or, in the case of vancomycin, an easily cleaved glycopeptide. However, it is premature to conclude at this time that such groups on the antibiotic structure are responsible for the antioxidant activity or inhibiting enzyme hydrolysis.

The invention and its operating parameters will be further understood with reference to the following detailed description.

DETAILED DESCRIPTION OF THE INVENTION

A. Synthetic Polymers

As developed in the background, above, synthetic polymers include a wide variety of complex substances made by reactions of relatively simple compounds. For example, vinyl halide monomers produce halogenated polymers and olefin monomers produce polyolefins.

These synthetic polymers thus are made up of monomers containing, for example, olefinic carbon-to-carbon double bonds which are polymerizable or copolymerizable. Among the class of olefinic monomers are conjugated dienes, monoolefins, acrylate esters, vinyl cyanides, vinyl aromatic compounds, vinyl halides, vinyl ethers, and the like. These olefinically unsaturated monomers may include functional groups such as unsaturated carboxylic acids including, for example, acrylic acid, crotonic acid, sorbic acid, maleic acid, oleic acid, and the like. Also included as monomers copolymerizable with the foregoing monomers in the formation of plastic and/or rubbery polymers include acrylate esters such as methyl acrylate, ethyl acrylate, butyl acrylate, and the like. Vinyl halide resins or polymers are formed from vinyl halides such as vinyl chloride, vinyl bromide, vinyl fluoride, vinyl iodide, vinylidine chloride, and the like. Phenolic polymers are well known and include phenol-formaldehyde resins and urea-formaldehyde resins. Cellulosic polymers include those polymers of ethyl cellulose, cellulose nitrate, cellulose acetate-butyrate, and cellulose acetate. Other polymers include polyepoxy, polyester, polyurethane, polysiloxane, etc. It will be understood by a person of ordinary skill in the art that many varieties of polymers may result from the polymerization monomers of the type described above or polymerization of simple reactants.

B. Antibiotics as Polymer Antidegradants

As developed above, this invention is directed to a new class of synthetic polymer antidegradants. As also described above, the term "antibiotic" is used to define a chemical substance produced by a microorganism which has the capacity to inhibit the growth of, or to kill, other microorganisms. These antibiotics are to be distinguished from biocides which are chemicals that kill microorganisms. When used in an effective amount in a synthetic polymer composition, antibiotics have been found to inhibit or prevent the degradation of the polymer.

In the presently most preferred form of the invention, glycopeptide antibiotics and β-lactam antibiotics are employed. Glycopeptide antibiotics are exemplified by streptomycin, neomycin, gentamicin, and vancomycin. β-lactam antibiotics are exemplified by amoxicillin.

Reference may be made to U.S. patents as disclosing antibiotics suitable for use in accordance with the principles of this invention. For example, U.S. Pat. No. 3,192,198 discloses amoxicillin, otherwise known as α-amino-p-hydroxybenzylpenicillin. Amoxicillin contains a phenolic hydroxyl group which is not sterically hindered.

Another example of such a phenolic hydroxyl group-containing antibiotic is cefadroxil which is disclosed in U.S. Pat. Nos. 3,816,253 and 3,864,340. Cefadroxil is otherwise known as p-hydroxycephalexine monohydrate. For comparison, ampicillin is disclosed in U.S. Pat. Nos. 2,985,648; 3,079,307; 3,140,282; 3,144,445; and 3,157,640.

Ampicillin does not contain a phenolic hydroxyl group as is the case with amoxicillin and cefadroxil. Vancomycin is disclosed in U.S. Pat. No. 3,067,099 and is an amphoteric glycopeptide antibiotic. Vancomycin contains phenolic hydroxyl groups and a plurality of phenolic glycoside ether groups. The above patent descriptions are incorporated herein by reference.

When used as a heat or light stabilizer, for example, in a vinyl halide resin, the antibiotics may range in amounts of from about 0.02 to about 5 phr based on 100 parts of vinyl halide resin, typically PVC. When employed in polyolefins, for example, lower amounts of antibiotics may be used on the order of 200 ppm to 2% by weight to demonstrate their antioxidant properties or resistance to shear-induced degradation.

C. Degradation Reactions as Influenced by Antibiotics Which Resist Enzymatic Attack The degradation of most synthetic polymers is a function of their carbon-hydrogen bonds; the thermodynamic drive to oxidize a C—H bond being very favorable. The worst feature is that it is a chain reaction, self-propagating, fast, and with high yield. In the classical description, the reaction includes initiation (1 & 2) and propagation (3-7):

  (1)

  (2)

  (3)

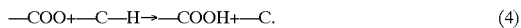  (4)

Reaction 4 leads to generation of the hydroperoxide, —COOH, a source of further radicals through action of heat of UV light:

  (5)

Both new radicals have sufficient activity to abstract hydrogen:

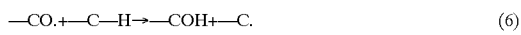  (6)

  (7)

Thus, if (5) is uninhibited, the chain reaction develops a very high yield through (6) and (7). Reaction (5) is known to be catalyzed by a number of transition metals:

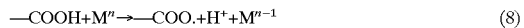  (8)

  (9)

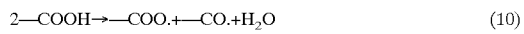  (10)

For (10) to proceed, the metal in question must have two oxidation states separated by one electron that are relatively close in energy, e.g., Fe, Cu, Ni, Mn, Co, V, Ti. With electron withdrawing ligands, such as halogen, on the metal, coordination to hydroperoxide oxygen becomes favorable and catalyst efficiency in (10) very high. This has the effect of greatly lowering the activation energy for degradation.

An objective of this invention is that an antibiotic will function as an antioxidant (A/O) to interfere with propagation:

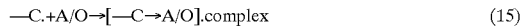  (15)

That is, that the antibiotic antioxidant complexes the radical before it is oxidized and becomes too stable for propagation to continue efficiently. Desirably, it will lose energy as heat in harmless vibration, then decompose to regenerate the antibiotic antioxidant and a "slow" polymer radical. This will likely still oxidize, but as a poor participant in a chain reaction. This, yield will be limited and degradation slowed. As a second choice, perhaps instead the oxidized radical will be trapped:

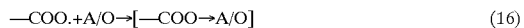  (16)

When the complex breaks up, the regenerated oxidized radical will still lead to degradation, but much more slowly. Again, we have the conversion of a high speed, high yield chain reaction into a slower, lower yield process, using the antibiotic antioxidant as a reverse catalyst (an additive that lowers a reaction rate and is itself not consumed). If neither happens, even the complex will abstract hydrogen:

  (17)

That is, eventually the antibiotic antioxidant will be oxidized. This is inevitable but not a desired event. The worst feature of chain reaction oxidation of the C—H bond lies in hydroperoxide decomposition (Reaction 5). Secondary antioxidants, often referred to a synergists, may be employed to decompose hydroperoxides yielding more or less harmless products. The major categories are phosphite esters and divalent sulfur compounds. The former abstract hydrogen from hydroperoxides through a 4-center reaction:

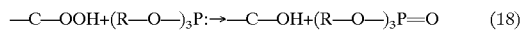  (18)

Similar reactions are found with activated divalent sulfur compounds:

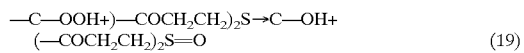  (19)

Although it is preferred for (17) to reverse, conversion to hydroperoxide becomes increasingly competitive:

  (20)

Secondary antioxidants, in their destruction of hydroperoxides, become regenerators of primary antioxidant:

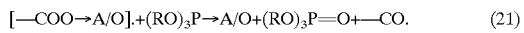
(21)

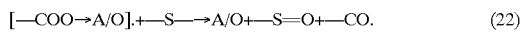
(22)

With this sacrifice, the primary antibiotic antioxidant has been regenerated and the chain reaction broken. Again, the released radical will be oxidized, but not autocatalytically at a highly destructive rate. For this last mode of action to be significant, there must be primary/secondary interaction.

As stated above, it is believed that effective antibiotics are those which resist enzyme hydrolysis. Mechanisms by which antibiotics are attacked by enzymes have been proposed with reference to *Understanding Antibacterial Action and Resistance*, $2^{nd}$ Ed., A. D. Russell and I. Chopra (of SmithKline Beecham) Ellis Horwood, UK, 1996, pp. 183–186 and 195; and *Bacteria and Antibacterial Agents*, J. Mann and M. J. C. Crabbe, Spektrum, Oxford, 1996, Ch. 5 & Ch. 6.

The following examples illustrate the practice of this invention.

EXAMPLE 1 (COMPARATIVE)

A building wire jacket compound was prepared having the recipe (parts by weight): PVC 100, calcium carbonate 55, DIDP 64, stabilizer 1.5. The stabilizer comprised (parts by weight): zeolite 60, zinc stearate 25, calcium stearate 13, bisphenol A 2%. Dynamic stability was run in a torque rheometer at 190° C., 90 rpm. Failure time (first rise in viscosity) was 60 minutes.

EXAMPLE 2 (COMPARATIVE)

In the composition of Example 1, bisphenol A was replaced by ampicillin. Failure time was 51 minutes. With no additive at all, failure time was 48 minutes. Thus, an antibiotic with no phenolic hydroxyl group had virtually no effect in PVC.

EXAMPLE 3

In the compound of Example 1, bisphenol A was replaced by amoxicillin, an antibiotic with a phenolic hydroxyl group. Failure time was 194 minutes. With, instead, the antioxidant most generally used, ICI Topanol Calif. [tris (methylhydroxy-t-butylphenyl)butane], failure time was 97 minutes. Thus, the superior antioxidant effect of amoxicillin has been demonstrated.

EXAMPLE 4

In polypropylene homopolymer, Union Carbide CAC408, rheometer conditions of 190° C., 90 rpm caused process viscosity to drop to half its original value in 36 minutes. Addition of 0.2% bisphenol A had no effect on this shear-induced degradation, nor did addition instead of 0.2% cephalexin (an antibiotic without a phenolic hydroxyl group). Addition of 0.1% Ciba Additives Irganox 1076 hindered phenolic antioxidant (octadecyl di-t-butylhydroxyhydrocinnamate) and 0.2% Irgaphos 168 phosphite synergist [tris(di-t-butylphenyl)phosphite] increased the time needed for 50% loss of viscosity to 58 minutes. Use, instead, of 0.2% cefadroxil, identical to cephalexin except for the presence of an unhindered phenolic —OH group, lengthened this time to 116 minutes. Almost identical results were obtained with latamoxef and cephamycin.

EXAMPLE 5

A polyethylene copolymer, Union Carbide Flexomer, was run in the rheometer at 210° C., 90 rpm. Discoloration was evident after 20 minutes. Addition of 0.2% bisphenol A led to discoloration after 12 minutes. Use, instead, of 0.2% streptomycin resulted in discoloration after 18 minutes. Addition, instead, of 0.1% Irganox 1076 and 0.2% Irgaphos 168 delayed discoloration to 38 minutes. Use instead of Vitamin E (alpha-tocopherol) at 0.2% lead to strong yellowing after 20 minutes. Replacement with 0.2% vancomycin led to a discoloration point of 90 minutes.

Having described this invention, its advantages and parameters, it will be obvious to a person of ordinary skill in the art, in view of the above description, that variations thereof may be made without parting from the spirit and scope thereof.

What is claimed is:

1. A stabilized polyvinyl halide polymer composition consisting essentially of a polyvinyl halide polymer and a phenolic hydroxyl group-containing β-lactam antibiotic selected from the group consisting of amoxicillin, latamoxef, cephamycin, and cefadroxil, and mixtures thereof, as a polymer antidegradant in an amount to confer an antidegradent effectiveness upon said polymer.

2. The composition of claim 1 wherein the antibiotic is present in an amount of from about 0.02 to about 5 parts and said polymer is present is an amount of about 100 parts.

3. The composition of claim 1 wherein said polyvinyl halide is polyvinyl chloride.

4. The composition of claim 3 wherein the antibiotic is present in an amount from about 0.02 to about 5 parts and said polymer is present in an amount of about 100 parts.

5. The composition of claim 3 wherein said antibiotic is amoxicillin.

\* \* \* \* \*